Sept. 19, 1961 E. C. BULLARD ET AL 3,000,228
TRANSMISSION
Original Filed Jan. 31, 1955 5 Sheets-Sheet 1

INVENTORS.
EDWARD C. BULLARD
ARTHUR A. TOMENCEAK
BY JAMES E. ETTORRE

ATTORNEY

Sept. 19, 1961   E. C. BULLARD ET AL   3,000,228
TRANSMISSION
Original Filed Jan. 31, 1955   5 Sheets-Sheet 3

INVENTORS.
EDWARD C. BULLARD
ARTHUR A. TOMENCEAK
BY JAMES E. ETTORRE

ATTORNEY

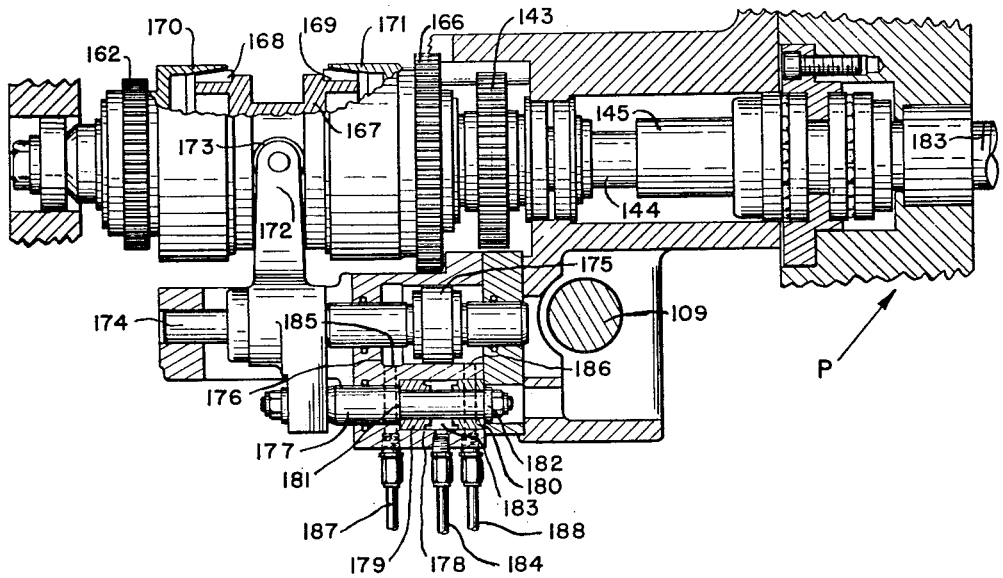
FIG. 6
INVENTORS.
EDWARD C. BULLARD
ARTHUR A. TOMENCEAK
BY  JAMES E. ETTORRE
ATTORNEY Sept. 19, 1961 E. C. BULLARD ET AL 3,000,228
TRANSMISSION
Original Filed Jan. 31, 1955 5 Sheets-Sheet 5

INVENTORS.
EDWARD C. BULLARD
ARTHUR A. TOMENCEAK
BY JAMES E. ETTORRE
ATTORNEY

United States Patent Office 3,000,228
Patented Sept. 19, 1961

3,000,228
TRANSMISSION
Edward C. Bullard, Southport, and Arthur A. Tomenceak and James E. Ettorre, Fairfield, Conn., assignors to The Bullard Company, a corporation of Connecticut
Original application Jan. 31, 1955, Ser. No. 484,998, now Patent No. 2,947,188, dated Aug. 2, 1960. Divided and this application Nov. 10, 1959, Ser. No. 852,002
7 Claims. (Cl. 74—364)

The present invention relates to transmissions, and particularly to a new and improved feedworks transmission for machine tools and a controller therefor.

This is a division of application Serial No. 484,998, filed January 31, 1955, now Patent No. 2,947,188 issued August 2, 1960, in the names of Edward C. Bullard, Arthur A. Tomenceak and James E. Ettorre, to which application attention is directed for details not specifically described herein.

An object of this invention is to provide a feedworks transmission for a machine tool in which separate coarse and fine rates of output rotation may be accomplished in order to produce coarse and fine rates of feed for a tool of a machine tool.

Another object of the invention is to provide such a transmission including a controller adapted to render effective said coarse and fine feed output at predetermined intervals and in a predetermined order.

Another object of this invention is to provide such a transmission in which a relatively rapid output speed is also produced as well as the coarse and fine rates in order to move a tool at a relatively rapid traverse rate.

Another object of the invention is to provide such a transmission in which the relatively rapid output is rendered effective by friction clutch means, and the coarse and fine speeds are rendered effective by positive clutch means.

Another object of the invention is to provide such a transmission in which the clutches are hydraulically operated.

The above, other objects and novel features of the invention will become apparent from the following specification and accompanying drawings which are merely exemplary.

In the drawings:

FIG. 6 is a sectional elevational view taken substantially along line 6—6 of FIG. 3, but rotated counterclockwise through 90°;

Figure 1:
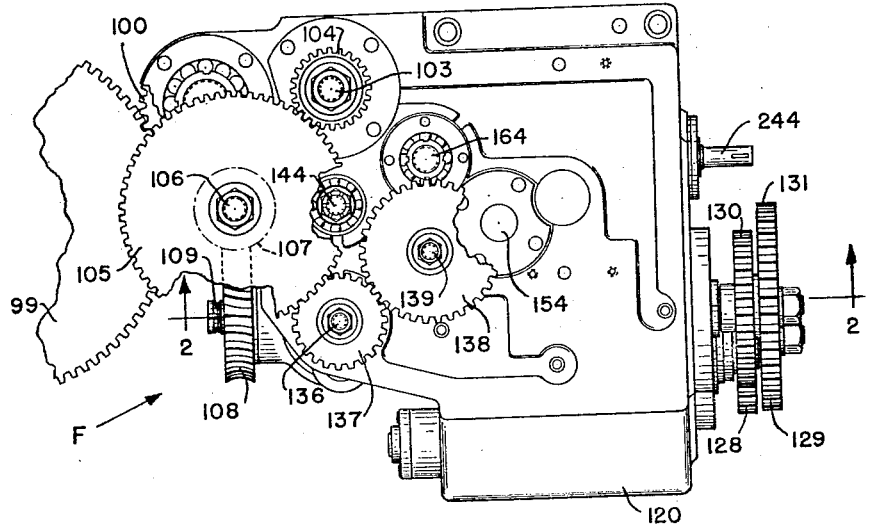
FIG. 1 is a top plan view of a feedworks transmission to which the principles of the invention have been applied.
Figure 2:
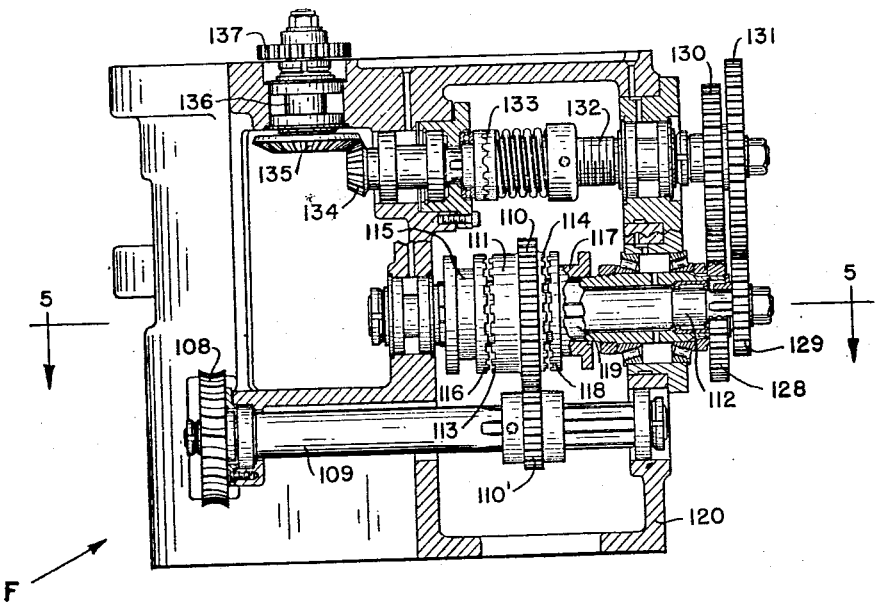
FIG. 2 is a sectional elevational view taken substantially along line 2—2 of FIG. 1.
Figure 3:
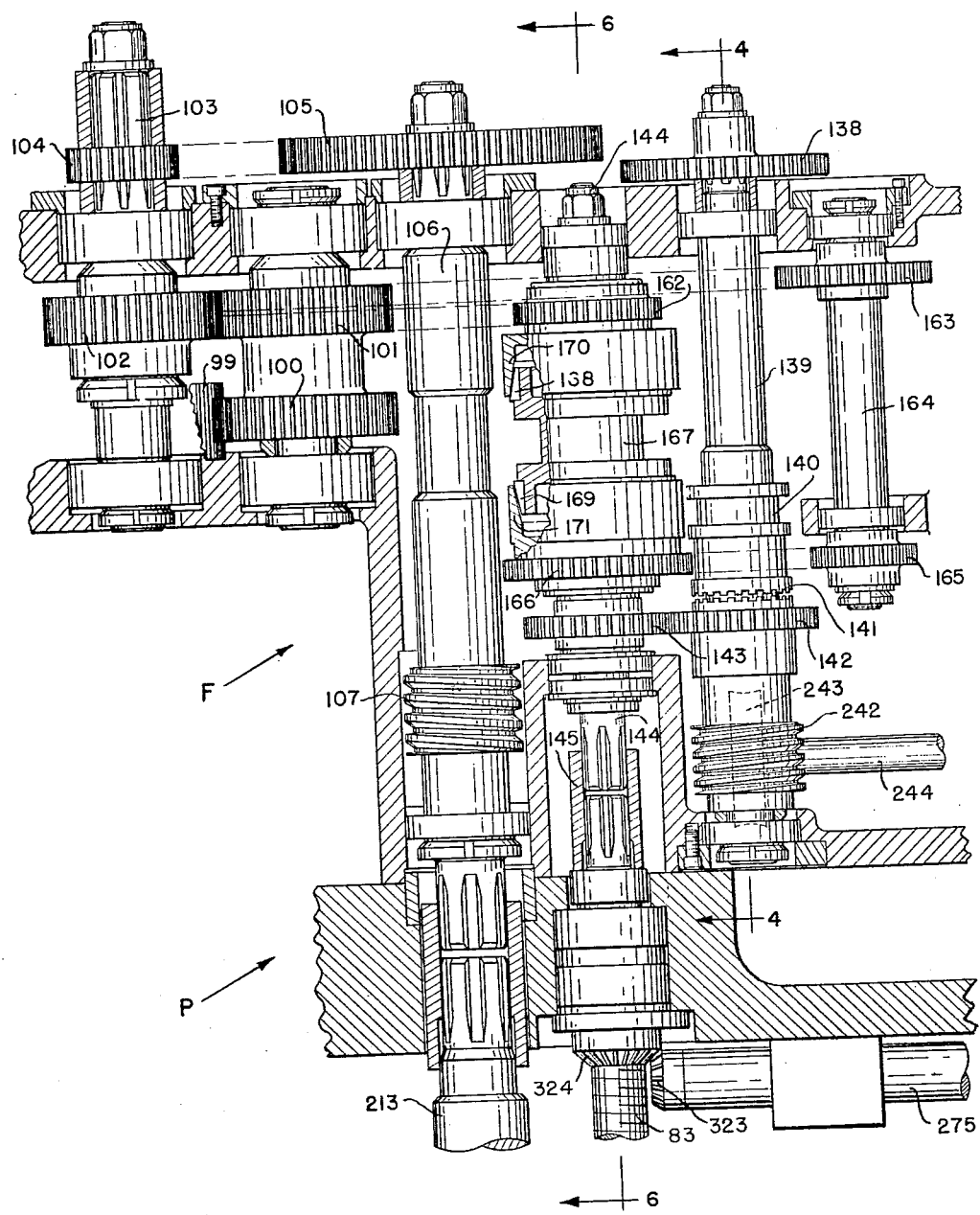
FIG. 3 is a stretch-out sectional elevational view of the transmission shown in FIGS. 1 and 2.
Figure 5:
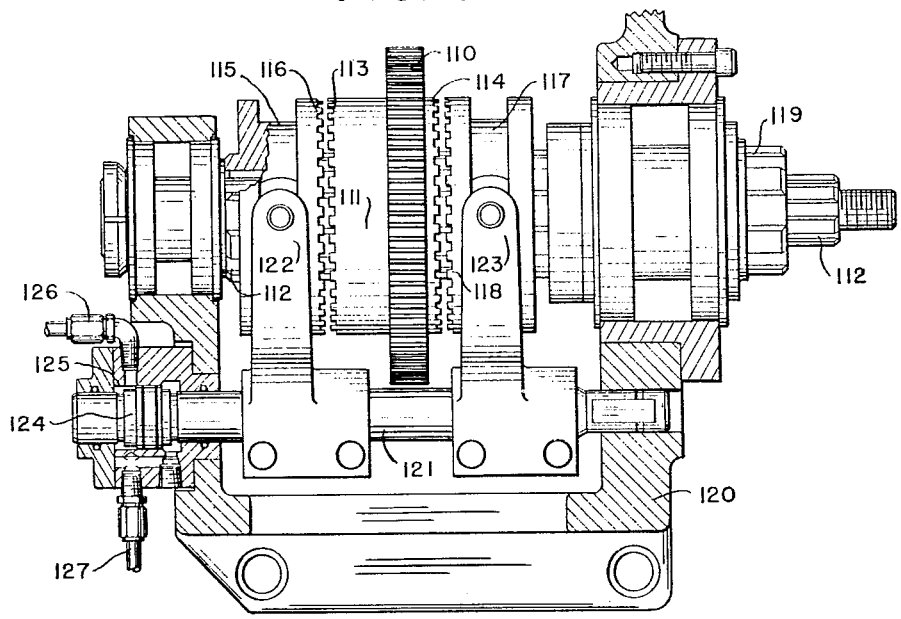
FIG. 5 is a sectional plan view taken substantially along line 5—5 of FIG. 2.

Referring to FIG. 3, which is a stretch-out showing of a feedworks transmission F, power is adapted to be supplied to it from a bull gear 99 (see also FIG. 1) which receives its power from an electric motor or the like through a speed reduction unit not shown. One gear 100 of a cluster gear is in mesh with the bull gear 99, and the other gear 101 thereof meshes with a gear 102 on a back shaft 103 of the transmission F. Another gear 104 splined to the back shaft 103 meshes with a gear 105 that is fixed to a vertically-disposed shaft 106. The shaft 106 has fixed to it a worm 107 that meshes with a worm gear 108 (FIGS. 1 and 2) that is fixed to a shaft 109. A spur gear 110' is fixed to the shaft 109 and it meshes with a gear 110 integral with a sleeve 111 that is freely rotatable about the axis of a shaft 112. The sleeve element 111 is provided with positive clutch engaging teeth 113 and 114 on opposite ends thereof. A shiftable clutch spool 115 having positive clutch engaging teeth 116 is splined to the shaft 112 and is adapted to be moved rightwardly (FIG. 5) to connect the gear 110 to the shaft 112, and to be moved leftwardly to disengage the gear 110 from shaft 112. Another clutch shifting element 117 having positive clutch engaging teeth 118 is splined to a sleeve 119 that is freely rotatable about the axis of the shaft 112. The clutch element 117 is adapted to be moved leftwardly (FIG. 5) to connect the gear 110 to the splined sleeve 119, and to be moved rightwardly to disengage the gear 110 therefrom. Referring to FIG. 5, a housing 120 for the feedworks F supports a draw bar 121. The draw bar 121 has clutch shifting fingers 122 and 123 fixed to it, which cooperate with the clutch shifting elements 115 and 117, respectively. The draw bar 121 has fixed to its one end a piston 124 that is adapted to be reciprocated within a cylinder 125 attached to the bracket 120. Liquid under pressure is adapted to be admitted to the cylinder 125 on the lefthand side of the piston 124 by a line 127. Accordingly, admission of liquid under pressure to the cylinder 125 from the line 126 will cause the gear 110 to be connected to the shaft 112; and, admission of liquid under pressure to the cylinder 125 through the line 127 will cause the gear 110 to be connected to the splined sleeve 119.

Referring again to FIG. 2, a spur gear 128 is keyed to the sleeve 119 and a different ratio gear 129 is keyed to the shaft 112. Gears 128 and 129 mesh with gears 130 and 131, respectively, both of which latter are keyed to a shaft 132 parallel to shaft 112. It is evident that the ratio of feed between the shaft 109 and the shaft 132 can be preset for coarse and fine feed by placing the proper gears on the shaft 112, the sleeve 119 and the shaft 132. The shaft 132 is provided with the usual type of rattle clutch 133 for safety purposes, and the end of the shaft 132 opposite that to which the gears 130 and 131 are connected has fixed to it a bevel pinion 134. Bevel pinion 134 meshes with a bevel gear 135 fixed to a stub shaft 136 that extends upwardly above the top of the feedworks F. A spur pinion 137 is fixed to the stub shaft 136 on the top of the feedworks F and it meshes with a spur gear 138 (FIGS. 1 and 3) that is keyed to a vertically-disposed shaft 139 parallel with the shaft 106, and extending downwardly into the housing of the feedworks F.

Figure 4:
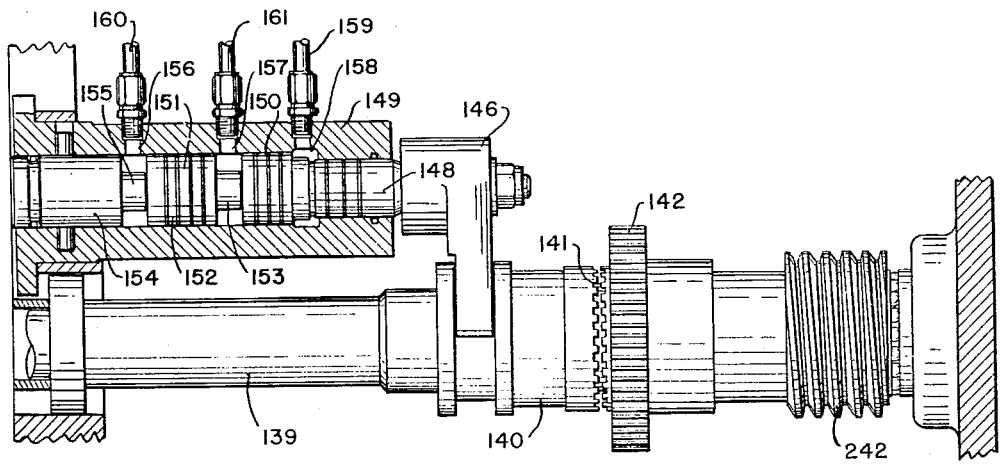
FIG. 4 is a sectional elevational view taken substantially along line 4—4 of FIG. 3.

Referring to FIGS. 3 and 4, the shaft 139 is arranged in parallel relation with respect to a screw 83. The shaft 139 is provided with a clutch shifting element 140 that is splined thereto and includes positive-action clutch teeth 141. The shaft 139 also supports a spur gear 142 for free rotation thereon. The gear 142 meshes with a similar spur gear 143 (FIG. 3) that is keyed to a shaft 144 coaxial with the screw 83 and parallel with the shaft 139. Shaft 144 is coupled to the screw 83 by a sleeve coupling 145. Referring to FIG. 4, the clutch 140 is connected to a clutch-shifting finger 146 that is fixed to a piston rod 148, which latter extends into a cylinder 149 arranged in parallel relation relatively to the shaft 139. The piston rod 148 is integral with a piston 150. Within the cylinder 149 and in line with the piston 150, an auxiliary piston 151 is located. The piston 151 is provided with an enlarged portion 152 and a smaller diameter portion 153 for a purpose to be described later. The cylinder 149 has its end opposite that receiving the piston rod 148 closed by a fixed plug 154 having a portion of reduced diameter 155. Ports 156, 157 and 158 admit liquid under pressure to the cylinder 149. Constant pressure liquid is adapted at all times to be admitted to the cylinder 149 through the port 158 from a line 159, thereby acting on the effective area of the piston 150. When the ports 156 and 157 are open to exhaust, pistons 150 and 151 are urged leftwardly (FIG. 4) into abutting relation with the smaller diameter portion 155 of the plug 154, thereby maintaining the positive action clutch teeth 141 out of engagement with the positive action clutch teeth of the gear 142.

The ports 156 and 157 in the cylinder 149 are connected to lines 160 and 161, respectively. The admission of liquid to either of the lines 160 and 161 will cause the piston 148 to move rightwardly (FIG. 4) and the clutch 140 downwardly (FIG. 3), thereby effecting engagement between clutch teeth 141 and those on the gear 142 to thereby cause the rotation of the screw 83 and to move a tool head downwardly.

Referring again to FIG. 2, it will be noted that the two sets of transfer gears 128, 130 and 129, 131 provide fast and slow rates of rotation of the shaft 132, respectively. Should the clutch 117 be connected to gear 110, gears 128 and 130 rotate the shaft 132 at a relatively rapid rate; and should the clutch 115 be engaged with the gear 110, the shaft 132 is rotated through the gear train 129 and 131 at a relatively slow rate. From the foregoing, it is evident that the tool head can be fed at a fast or slow rate depending upon whether clutch 117 or 115 is connected to gear 110. Of course, the gears 128, 129, 130 and 141 are change or transfer gears and any desired feed rates can be provided by selecting the proper gear ratio between shafts 112 and 132.

Referring again to FIG. 3, the gear 102 meshes with a gear 162 journaled on the shaft 144. This gear 102 also meshes with a gear 163 that is fixed to a shaft 164 parallel with the shaft 144. Another gear 165 fixed to shaft 164 meshes with a gear 166 journaled on the shaft 144.

From the foregoing, it is evident that the gears 162 and 166 rotate in opposite directions at relatively fast rates of speed, as distinguished from the speed at which the gear 143 can be rotated. A shiftable clutch mechanism 167 is splined to the shaft 144 and is provided with friction, clutch-engaging portions 168 and 169 that are adapted to cooperate with mating clutch-engaging surfaces 170 and 171 fixed to the gears 162 and 166, respectively. The shifting of the clutch element 167 upwardly and downwardly will effect the relatively rapid rotation of the screw 83 to thereby provide a rapid traverse rate of motion of the tool head either upwardly or downwardly.

Referring to FIG. 6, a clutch shifting finger 172 is provided with a roller 173 that cooperates with a groove within the clutch mechanism 167. The finger 172 is fixed to a shaft 174 to the one end of which is attached a piston 175 that is adapted to be reciprocated within a cylinder 176. Finger 172 is likewise fixed to a piston rod 177 parallel with the shaft 174 and extending into a cylinder 178. Pistons 179 and 180 are slidably mounted on the rod 177 within the cylinder 178. The rod 177 is provided with a shoulder 181 that cooperates with the piston 179, and a washer 182 that cooperates with the piston 180. Cylinder 178 is provided with a port 183 connected to a line 184 through which liquid under constant pressure is continuously adapted to be supplied. The construction and arrangement of the parts are such that the pistons 179 and 180 are constantly urged apart, normally maintaining the clutch 167 in a neutral position. The cylinder 176 is provided with ports 185 and 186 connected to lines 187 and 188, respectively. The ports 185 and 186 are located on opposite sides of the piston 175 so that the admission of liquid under pressure to the cylinder 176 through the line 187 will cause piston 175 to move rightwardly (FIG. 6) since the effective area of the piston 175 is substantially greater than the effective area of the pistons 179 and 180. Rightward movement of piston 175 will effect the engagement of the clutch elements 169 and 171 to cause the screw 83 to rotate in a relatively rapid rate in one direction. Admission of liquid under pressure to the line 188 and exhausting the liquid in line 187 causes the piston 175 to move leftwardly (FIG. 6) thereby effecting the engagement of the clutch elements 168 and 170, whereupon the screw 83 is caused to rotate in a reverse direction at a relatively rapid rate. Exhausting both the lines 187 and 188 immediately causes the pressure within the line 184 to neutralize the clutch 167.

Figure 7:
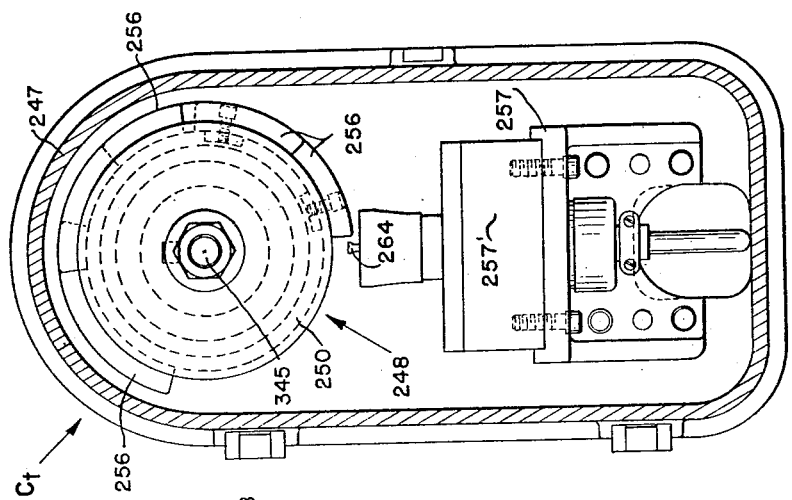
FIG. 7 is an elevational view of a controller for the transmission shown in FIG. 1.
Figure 8:
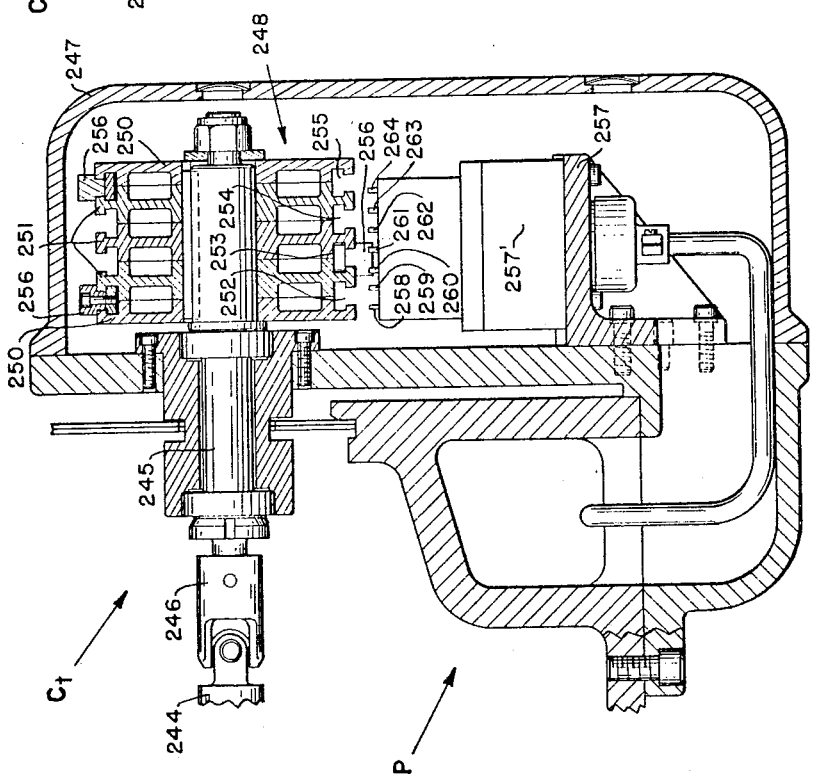
FIG. 8 is a sectional view taken substantially along line 8—8 of FIG. 7.

Referring to FIGS. 7 and 8, the feedworks F is provided with a separate control $C_t$. Referring to FIG. 3, a worm 242 integral with gear 142 meshes with a worm gear 243 fixed to a shaft 244. Referring to FIG. 8, the shaft 244 is connected to a shaft 245 by a universal joint 246. The shaft 245 extends into a housing 247 of the control $C_t$ and has keyed to it a control drum 248. The drum 248 is made up of a plurality of individual discs 250 and 251 forming between adjacent ones, grooves 252, 253, 254 and 255. Dogs 256 are adapted adjustably to be located peripherally around the drum 248 in the slots 252 to 255. Also located within the housing 247 is a support 257 on which is mounted a switch box 257' containing switches 258, 259, 260, 261, 262, 263 and 264. The peripheral dimension of the drum is proportional to the travel of the tool head, and since there is a positive geared drive between the screw 83 and the drum 248, it is evident that every point about the drum corresponds to a point in the travel of the head. Accordingly, presetting a dog 256 in the slot 252 to simultaneously operate switches 258 and 259 will stop upward traverse movement of the tool head. The switches 260 and 261 within the switch box 257' are adapted to control the extent of coarse feed, and the switches 262, 263 are adapted to control the duration of fine feed. These two feeds, as previously described, are effective by the shifting of the clutches 115 and 117 (FIG. 5). The switch 264 within the switch box 257' is a timer switch.

Although the various features of the new and improved transmission have been shown and described in detail to fully disclose one embodiment of the invention, it will be evident that numerous changes may be made in such details and certain features may be used without others without departing from the principles of the invention.

What is claimed is:

1. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; and transfer gears in each of said parallel power paths for changing the relative rotations of said third and second shafts.

2. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; and selectively operable clutches within said power paths for connecting the transfer gears in each path to said second shaft.

3. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; selectively operable clutches within said power paths for connecting the transfer gears in each path to said second shaft; and a clutch for connecting and disconnecting a selected one of said transfer gears in said parallel power paths to said third shaft.

4. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; selectively operable fluid-operated clutches within said power paths for connecting the transfer gears in each path to said second shaft; and a fluid-operated clutch for connecting and disconnecting a selected one of said transfer gears in said parallel power paths to said third shaft.

5. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; a control drum geared to said third shaft; and dogs on said control drum for rendering effective said parallel power paths in a predetermined order.

6. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; selectively operable clutches within said power paths for connecting the transfer gears in each path to said second shaft; a clutch for connecting and disconnecting a selected one of said transfer gears in said parallel power paths to said third shaft; a control drum geared to said third shaft in a manner to be unaffected by said last-mentioned clutch; and dogs on said control drum for rendering effective all of said clutches in a predetermined order.

7. In a transmission, first and second parallel shafts; intermeshing transfer gears keyed to said shafts for changing the relative rotation of one to the other; a third shaft; a reversible gear drive connecting said first shaft and said third shaft; parallel power paths connecting said second shaft and said third shaft; transfer gears in each of said parallel power paths for changing the relative rotations of said third and second shafts; selectively operable fluid-operated clutches within said power paths for connecting the transfer gears in each path to said second shaft; a fluid-operated clutch for connecting and disconnecting a selected one of said transfer gears in said parallel power paths to said third shaft; a control drum geared to said third shaft in a manner to be unaffected by said last-mentioned clutch; and dogs on said control drum for rendering effective all of said clutches in a predetermined order.

References Cited in the file of this patent

UNITED STATES PATENTS

| | | |
|---|---|---|
| 2,557,896 | Soule et al. | June 19, 1951 |
| 2,701,477 | Schoepe | Feb. 8, 1955 |
| 2,712,140 | Curtis et al. | July 5, 1955 |
| 2,774,250 | Gallimore | Dec. 18, 1956 |